United States Patent
Barak et al.

(10) Patent No.: US 7,593,729 B2
(45) Date of Patent: *Sep. 22, 2009

(54) POINT TO POINT LINK AND COMMUNICATION METHOD

(75) Inventors: Oz Barak, Hod Hasharon (IL); Assaf Touboul, Natanya (IL)

(73) Assignee: Designart Networks Ltd, Ra'Anana (IL)

( * ) Notice: Subject to any disclaimer, the term of this patent is extended or adjusted under 35 U.S.C. 154(b) by 147 days.

This patent is subject to a terminal disclaimer.

(21) Appl. No.: 11/624,232

(22) Filed: Jan. 18, 2007

(65) Prior Publication Data

US 2008/0080364 A1    Apr. 3, 2008

Related U.S. Application Data

(60) Provisional application No. 60/830,727, filed on Jul. 13, 2006, provisional application No. 60/843,079, filed on Sep. 8, 2006.

(51) Int. Cl.
H04W 36/00 (2006.01)
H04W 24/00 (2006.01)
H04B 15/00 (2006.01)
H04M 1/00 (2006.01)

(52) U.S. Cl. .............. 455/435.1; 455/456.3; 455/502; 455/562.1; 370/210; 370/235; 370/328; 370/330; 370/331; 725/62; 235/380

(58) Field of Classification Search .............. 455/435.1, 455/456.3, 502, 562.1; 235/380; 370/330, 370/331, 352, 210, 235, 328; 725/62
See application file for complete search history.

(56) References Cited

U.S. PATENT DOCUMENTS

| | | | |
|---|---|---|---|
| 2004/0162093 A1* | 8/2004 | Bevan et al. | 455/502 |
| 2005/0282586 A1* | 12/2005 | Rutherford et al. | 455/562.1 |
| 2006/0219776 A1* | 10/2006 | Finn | 235/380 |
| 2007/0008925 A1* | 1/2007 | Dravida et al. | 370/331 |
| 2007/0010248 A1* | 1/2007 | Dravida et al. | 455/435.1 |
| 2007/0010261 A1* | 1/2007 | Dravida et al. | 455/456.3 |
| 2007/0019552 A1* | 1/2007 | Senarath et al. | 370/235 |
| 2007/0076649 A1* | 4/2007 | Lin et al. | 370/328 |
| 2007/0094691 A1* | 4/2007 | Gazdzinski | 725/62 |
| 2008/0008159 A1* | 1/2008 | Bourlas et al. | 370/352 |
| 2008/0049672 A1* | 2/2008 | Barak et al. | 370/330 |
| 2008/0080364 A1* | 4/2008 | Barak et al. | 370/210 |

* cited by examiner

*Primary Examiner*—William D Cumming
(74) *Attorney, Agent, or Firm*—Deborah A. Gador (57) ABSTRACT

A method and point-to-point link for providing point-to-point wireless communication between a first and second node forming a link, the method including providing multiple concurrent transmissions from multiple antennas in an antenna array arrangement in the first node, controlling beam patterns of the antennas to manage deployment interference, and periodically allocating 1 to 3 MIMO (Multiple In Multiple Out) streams to different antennas in said antenna arrangement.

19 Claims, 7 Drawing Sheets

TYPE II

TYPE I

POINT TO POINT LINK AND COMMUNICATION METHOD

This application claims the benefit of Provisional Applications Nos. 60/830,727 and filed 13 Jul. 2006, 60/843,079, filed 8 Sep. 2006.

FIELD OF THE INVENTION

The present invention relates to communications networks, in general and, in particular, to point-to-point communication in next-generation mobile broadband wireless communication networks as a backhauling system.

BACKGROUND OF THE INVENTION

Broadband wireless is expected to be one of the main drivers of the telecommunications industry. There is a substantial increase in demand for broadband connectivity, with personal broadband being the key growth engine for mobile wireless broadband networks.

Communication in such networks is generally divided between access and backhaul. An access network is the air interface network providing traffic communication between mobile terminals (subscribers) and their associated access points (base stations), while a backhaul network is the air interface network providing traffic communication between the various base stations and a core network. The networks may be arranged to transfer data alone, as in Wi-Fi networks, or may be arranged for triple play services (video, audio and data), typically WiMAX (or other competitive technology, such as 3GPP-LTE). In conventional systems, the access network and the backhaul network each require their own separate transmission equipment, antennas, etc, at great cost to the operator.

One example of a conventional backhaul network is connecting wireless base stations to corresponding core mobile networks (ASN Gateway, AAA servers, etc). The choice of backhaul technology must take into account such parameters as capacity, cost and coverage. Base station backhaul typically is performed via wired infrastructure (e.g., E1/T1 leased lines), or via wireless Point-to-point (PTP) microwave links to each base station, which is expensive to deploy (equipment and installation). In particular, due to the direct, uninterrupted line-of-sight requirements of the wireless backhaul equipment, the backhaul components of conventional base stations require strategic deployment location on high and expensive towers.

Mobile WiMAX, as defined in IEEE Standard 802.16e—2005 Standardization for WiMAX, was originally designed to provide mobile broadband access for mobile devices, i.e., broadband wireless data-optimized technology, providing carrier-grade triple play services using a variety of user devices (such as laptops, PDAs, handheld devices, smart phones, etc.). A complete mobile WiMAX Radio Access Network (RAN) requires deployment of massive infrastructure, including base station sites with high towers, base station equipment, antennas, and a separate backhaul network, as described above.

The traditional approach for mobile WiMAX network infrastructure deployment is similar to that of cellular phone networks. The network is based on macro-cell deployment, that is, the base stations, radios and antennas are installed on top of high towers, transmitting at high power, so as to maximize the base station coverage area. In order to optimize the cost, the goal is to minimize the number of sites. This can be achieved by deploying more powerful base station equipment for increasing the cell range (e.g., high power radios, multiple radios on each sector with smart antenna techniques), resulting in more expensive base station equipment. However, for a broadband wireless network deployment, this approach is adequate mainly for the coverage phase, when a relatively small number of subscribers share the cell capacity. As the cell coverage area is large, covering a large number of potential subscribers, additional subscribers in each area can rapidly be blocked due to limited base-station capacity.

One proposal for increasing the traffic capacity of the base station, while not greatly increasing the interference caused with neighboring cells, is to use several directional antennae on a base station, each pointing in a different direction. In this way, it is possible to "sectorize" the base station so that several different sectors are served from the same location. (In any given direction, only a small number of frequencies are utilized). However, directional antennas are relatively expensive.

There are also known outdoor Wi-Fi networks, deployed mainly according to outdoor Wi-Fi mesh technology. The typical Wi-Fi setup contains one or more Access Points (APs), which is the equivalent terminology to Base Station in WiMAX, having relatively limited range, deployed along telephone poles, street poles, electricity poles and rooftops. Due to the access point unit's smaller coverage range, a large number of access point units are required to cover a given area. Conventional outdoor Wi-Fi access point units require costly power amplifiers in each Wi-Fi AP unit to extend the coverage range. In addition, conventional Wi-Fi networks operate only on unlicensed bands and suffer from severe interference and difficult radio-planning issues.

Furthermore, in the micro-/pico-cell deployment approach of conventional Wi-Fi-mesh networks, due to multiple access point nodes in the network, backhauling becomes more complicated and costly. Backhauling each node via wired lines (E1/T1 or DSL) is impractical in a dense deployment of nodes. On the other hand, backhauling each node via traditional wireless PTP microwave links is expensive due to costly equipment and installation costs and not feasible to deploy on telephone poles, street poles, electricity poles, etc. In Wi-Fi, like in WiMAX, PTP microwave links require high towers to achieve a clear line-of-sight between nodes. In addition, when the network load is increased, the backhaul network losses drastically degrade the overall network performance (capacity and latency).

In traditional Point-to-Point (PTP) microwave backhaul operating in licensed bands or using unlicensed bands, OFDM (Orthogonal Frequency Division Multiplexing) or single carrier technology (constant power with a fixed modulation scheme) are typically employed. In OFDM, the channel bandwidth is divided into multiple concurrent parallel transmissions on several frequencies. However, during each time slot, there must be transmission over every frequency in the bandwidth. Thus, there is no granulation to permit correction of local interference, and, if there is a problem with transmission on one frequency, the entire transmission can be lost due to lack of frequency diversity, so the Signal to Noise Ratio (SNR) of a link (between two base stations) falls on the entire link.

Consequently, there is a long felt need for a wireless mobile broadband network that is relatively low in cost of infrastructure, but high in capacity for supporting a large number of broadband data subscribers. In particular, it would be useful to have such a network with improved PTP communication having high frequency diversity, variable modulation and coding, MIMO and dynamically adapted Beam Forming, according to the instantaneous link conditions.

SUMMARY OF THE INVENTION

The present invention adds an additional layer of communication to conventional wireless networks by providing improved Point-to-Point (PTP) communication between nodes in wireless networks. The point to point communication system of the invention can be utilized for a broadband wireless backhaul interconnection between access point nodes in the network. Thus, various nodes can communicate with one another, and not only with mobile subscribers or the core network, as in conventional networks. Each node can be an access point, a base station, a relay station, or any other infrastructure element which supports wireless infrastructure to infrastructure communication in a wireless network, and these terms will be used interchangeably in this application.

In particular, this communication system is suitable for use in next-generation mobile broadband wireless networks deployed like Wi-Fi or WiMAX networks. Each node preferably includes a single controller (typically a MAC controller) for controlling and coordinating both access and backhaul communications in the node. A conventional backhaul network, preferably a wired network, may be utilized to provide backhaul between the core network and each feeder node, which manages a cluster of nodes and distributes the traffic between the various nodes within the cluster.

According to a preferred embodiment, the method and system of the invention involve the use of an antenna array arrangement of multiple omni-directional antennas in each node, one coupled to each modem, each node being able to provide multiple concurrent transmissions over multiple antennas, for example, MIMO (Multiple In Multiple Out) for point-to-point transmissions over a single link, one to three MIMO streams being allocable among the various antennas in the array. Alternatively, a plurality of directional antennas can be utilized, and the number of streams will be defined in accordance with the number and beam width of the antennas. In this way, the present invention provides improved PTP communication having high frequency diversity, variable modulation, turbo or non-turbo coding, preferably using MIMO and dynamically adapted beam forming, according to the instantaneous radio link conditions (such as Signal to Noise Ratio) based on measurements performed over each single link and, when in a network, over a cluster of links (a plurality of nodes).

There is provided according to the present invention a method for providing point-to-point wireless communication between a first and second node forming a link, the method including providing multiple concurrent transmissions from multiple antennas in an antenna array arrangement in the first node, controlling beam patterns of the antennas to manage deployment interference, and periodically allocating 1 to 3 MIMO (Multiple In Multiple Out) streams to different antennas in said antenna arrangement.

There is also provided, according to the invention, a point-to-point link in a wireless communications network, the link including two nodes coupled for wireless communication; each node including an RF transceiver and associated modem; an antenna arrangement in each node for providing multiple concurrent transmissions; the antennas having a beam pattern selected for interference mitigation; a controller for allocating 1 to 3 MIMO streams to different antennas in the antenna arrangement; and means in the controller for allocating the MIMO streams and allocating modulation to the antennas.

According to a preferred embodiment of the invention, each node includes a single radio-PHY-MAC module for providing access and backhaul communication, and defining the directions and shapes of its communication beams.

BRIEF DESCRIPTION OF THE DRAWINGS

The present invention will be further understood and appreciated from the following detailed description taken in conjunction with the drawings in which:

FIGS. 5b and 5c illustrate two embodiments of sectorization by the antenna configuration of FIG. 5a;

DETAILED DESCRIPTION OF THE INVENTION

The present invention relates to a point-to-point communication system between wireless nodes in a wireless network, particularly a next-generation mobile broadband wireless network, serving as an access network or as an internal backhaul network between the various nodes, i.e., base stations, relay stations, access points, etc. For purposes of the present application, all the access and backhauling descriptions refer to any of these possibilities of infrastructure devices. In the discussion that follows, an access network is the air interface network providing communications between access points (base or relay stations) and mobile terminals, for example, as defined by IEEE802.16e—2005 standardization (WiMAX), and a backhaul network is the air interface network providing broadband wireless interconnection between access points within the network (and not traditional backhaul directly from each access point to the core).

According to one preferred embodiment of the invention, each node has a single controller for controlling and coordinating access and backhaul communication. Preferably, equipment for both access communication and point to point (PTP) backhaul communication is built-in in a single module. Thus, no additional, external equipment is required for backhaul communication between access points, resulting in a "zero-cost" interconnection. The PTP communication operates over the same spectrum allocation (same frequency channel) that is used for access to the wireless subscriber terminals ("in-band" backhauling). This capability is particularly useful for deployments in licensed frequency bands, where the availability of extra spectrum for backhauling might impact the cost of deployment. With this solution, no additional separate frequency slice is required for the backhaul network, saving the costs of additional spectrum fees and frequency planning.

Each PTP link is a high capacity point-to-point link connecting one node in the network to another node, and in backhaul, for transferring its aggregated traffic towards the core network. The high capacity in the PTP link is achieved via methods of increasing the link spectral efficiency (transmitted bits/sec/Hz), although this compromises the link budget (maximum path loss with received transmission). Preferably, this is accomplished by performing high density modulation (QPSK to 256 QAM at present) and providing multiple concurrent transmissions over multiple antennas. According to one embodiment, multiple transmissions are provided by creating virtual groups of omni-directional antennas, each group creating a beam at a certain beam width and transmitting a single stream. In this way, the spectral efficiency can be increased using MIMO (Multiple In/Multiple Out) antenna techniques (adaptively allocating 1, 2 or 3 MIMO streams to different antennas) resulting in a PTP link with much higher spectral efficiency as compared to the average access network spectral efficiency. The link budget can be improved by using beam forming with the omni-directional antennas.

A particular feature of one embodiment of the present invention is that the access and backhaul are integrated into a single entity, and managed by a single Radio-PHY-MAC unit, utilizing the same resources (same antennas, radio and digital hardware, same spectrum or frequency bank, and MAC functionalities) for both access and backhaul, and manipulating both traffic types on a frame by frame basis. A single scheduler (software algorithm) manages the traffic allocation to both the access point and PTP link portions, allocating traffic on each frame to each mobile station or backhaul node in accordance with a set of operator configurations for Quality of Service (QoS), which enables tight control of packet delay, packet delay jitter and packet rates for both backhaul and access portions.

Figure 1A:
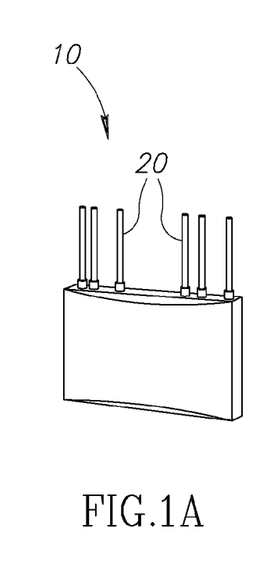
FIGS. 1a and 1b are respective plan view and sectional illustrations of a wireless next-generation mobile broadband node constructed and operative in accordance with one embodiment of the invention.
Figure 1B:
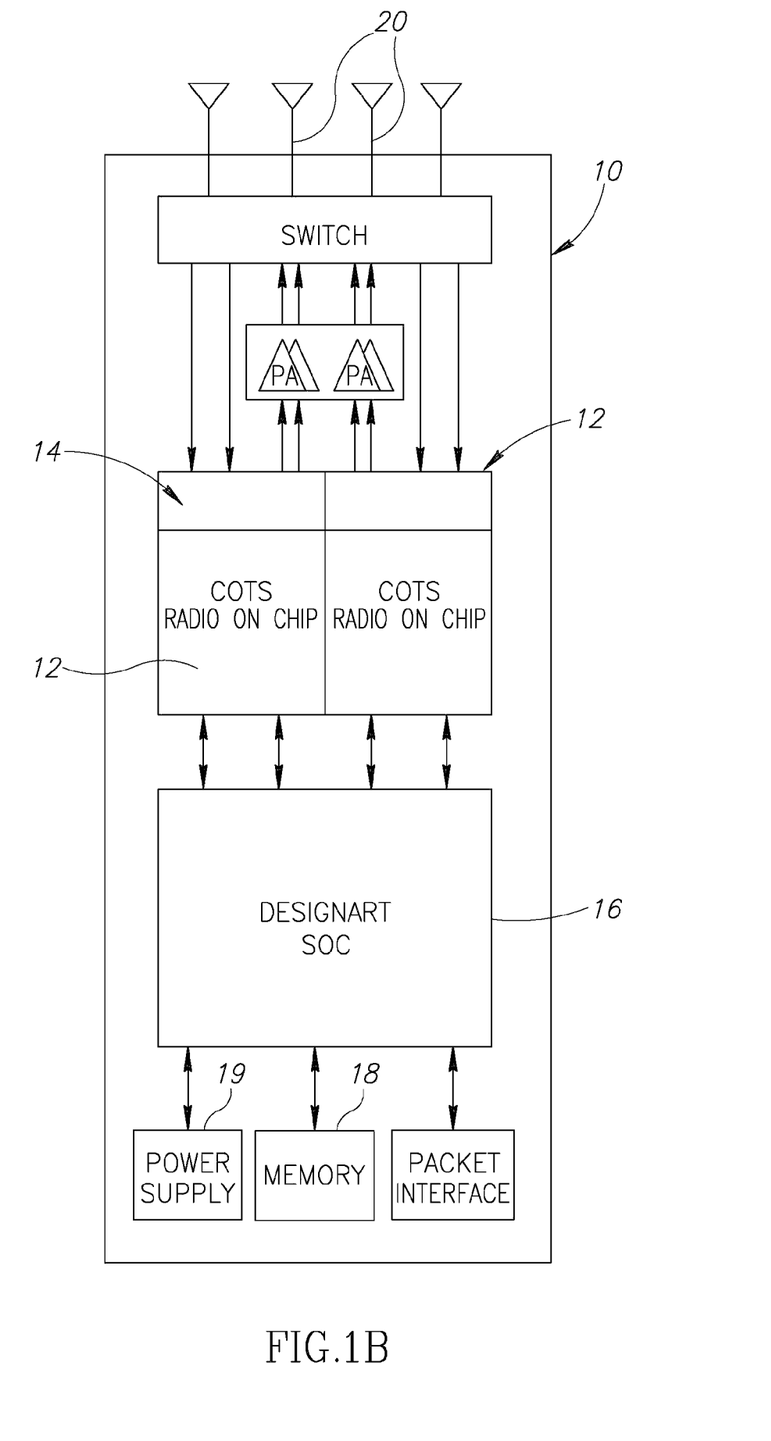

Referring now to FIGS. 1a and 1b, there are shown respective plan view and sectional illustrations of a wireless next-generation mobile broadband node 10, according to one embodiment of the invention, serving as an access point unit, base station, or relay station. Each node 10 includes at least one and, preferably, a plurality of RF transceivers 12 for access to mobile stations within its coverage range, as well as for the high capacity backhaul point-to-point (PTP) link for communication with other nodes in the network.

Each RF transceiver 12 is coupled to an antenna array arrangement 20. Preferably, antenna array arrangement 20 includes a plurality of omni-directional antennas, although alternatively, they can be directional antennas. A suitable modem is provided between each RF transceiver 12 and its associated antenna. In one embodiment, both access and backhaul are coordinated and synchronized by a single controller 16, here shown as a MAC controller, coupled to the transceivers, permitting utilization of the same hardware resources of the node, that is, the same radio, modem and antenna elements, for both access and backhaul. A memory 18 is provided for storing the various algorithms for operation of the node, as well as a power supply 19 to supply the low power (about 7W) required by the node components. When utilized in a WiMAX system, node 10 acts as a standard Mobile WiMAX 802.16e base station for access to WiMAX subscribers within its coverage range, as well as for the wireless backhaul link.

While each access point unit may include 6, 9 or even 12 antennas, the access point unit 10 of the embodiment shown in FIGS. 1a and 1b incorporates six radio hardware chains, each of which transmits and receives RF signals to/from one of the six antennas in antenna array arrangement 20, and the modem transmits signals over the six antennas to perform sectorization via beam forming techniques or MIMO. In this way, six complete channels are formed for smart antenna manipulations, such as beam-forming, and antenna diversity schemes, such as maximum Ratio Combining or STC, thus gaining range extension, reduced fade margin and improved link performance in multi-path conditions. When using directional antennas, the direction and width of the beam are dictated by the antenna physical location and antenna characteristics. However, the use of omni-directional antennas permits later selection of beam characteristics by forming virtual antenna groups, using smart antenna techniques configurable by software.

Each node is based on low-cost, standard off-the-shelf radio transceivers with power amplifiers ("terminal RF-IC" modules), such as those used at present in mobile consumer terminals. According to a preferred embodiment, each node also includes a plurality of low-cost standard omni-directional antennas, preferably arranged in groups of 6, 9 or 12 antennas. Using these modules drastically reduces the cost of the node. Therefore, each unit is a low-cost, low-power and small-form-factor unit.

The low cost RF transceivers may be those typically utilized in WiMAX mobile station handset units, which are designed, architecturally, to transmit low power. Thus, the radio is typically zero IF architecture, which requires compensation of I/Q phase misbalancing, gain misbalancing and DC offset. Therefore, working with "low-end" radio transceivers in a next-generation mobile broadband wireless base station requires a unique modem (PHY) design to compensate for the radio limitations, to comply with the standard requirements for base stations, and to enable high capacity point to point broadband employing high modulation, such as 64, 128 or 256 linear QAM modulation. In addition, phase noise should be filtered out in the receiver by a phase loop developed in the base band modem part, to increase the link immunity to the phase noise inherent in low cost radio transceivers. Furthermore, a large dynamic range is required to support concurrent near and far user transmissions in the base station uplink mode of operation, which is not a typical requirement of a receiver operating in mobile station mode. This is desirable since closer transmissions will be stronger than far transmissions, but all transmissions should be concurrently decoded without any power control incorporated within the receiver. This dynamic range requirement can be improved by using a large bit analog to digital (A/D) converter and/or by increasing the sampling frequency, which decreases quantization noise by decimating the signal and filtering it.

In addition, due to the problem of high transmission of out-of-band noise inherent in the low cost direct conversion radio existing in the mobile station unit, transmission power preferably is limited to the low power utilized in the mobile station. (Beam forming techniques can be used later to improve coverage or link budget by enhancing the power transmitted by the unit).

The receiver side of each access point node in the network preferably provides adaptive allocation of not only MIMO streams, but also of modulation and coding, as described below.

If desired, due to the fact that the PTP backhaul link will experience a high CINR, a backhaul coding scheme, which is not in used in IEEE 802.16e, can be used in addition to convolutional code and convolutional turbo code. A block turbo code or product turbo code, which is adapted to high SNR or CINR and high capacity (low latency iterative decoding), can optionally be used for backhaul PTP coding, particularly at higher modulations. This, theoretically, will increase coding gain of about 2 db at 25 db CINR link condition.

It will be appreciated that rate optimization can be provided, while compromising the extra range, by using higher modulation, preferably 128-256 QAM, in the PTP link, and by using MIMO, preferably 1 stream to 3 streams, to increase the rate in the PTP link. Preferably, the rate in the PTP link is adaptive—it can be adapted according to the link conditions (i.e., the change of link quality and the state of network interference) (SNR or CINR, BER or any other interference estimation) to achieve up to 256 QAM modulations. Adaptation of modulation can vary between QPSK, 16 QAM, 64 QAM, 128 QAM and 256 QAM, with the optimal modulation being selected in accordance with a pre-defined modulation adaptation scheme.

Adaptation of MIMO streams and modulation are interrelated and preferably are jointly determined. The adaptation of the modulation, coding and MIMO streams is based on the link SNR, level of interference and Bit Error Rate experienced within the link. See, for example, FIG. 2, a flow chart of a link adaptation process according to one embodiment of the invention, carried out by the MAC controller. As illustrated, each node sends a CQI (Channel Quality Information) message over the link (block 40) and receives the CQI message sent by the node connected to it (block 46). The CQI message can carry information on CINR on each remote antenna (block 40), e.g., effective CINR sampled by the remote receiver after the multiple antenna demodulating processing, received BER (Bit Error Rate) or BLER (Block Error Rate), received RSSI on each remote antenna, effective RSSI sampled by the remote receiver after the multiple antenna demodulating processing, and/or any additional link level estimator providing information on the link quality, due to signal attenuation or interference (block 40). In an alternative embodiment, the CQI information of each link side receiver is used to adapt the modulation of the link in its transmission by using channel and interference reciprocity. This will reduce complexity (no need for feedback), but also reduces the link adaptation performance.

Figure 2:
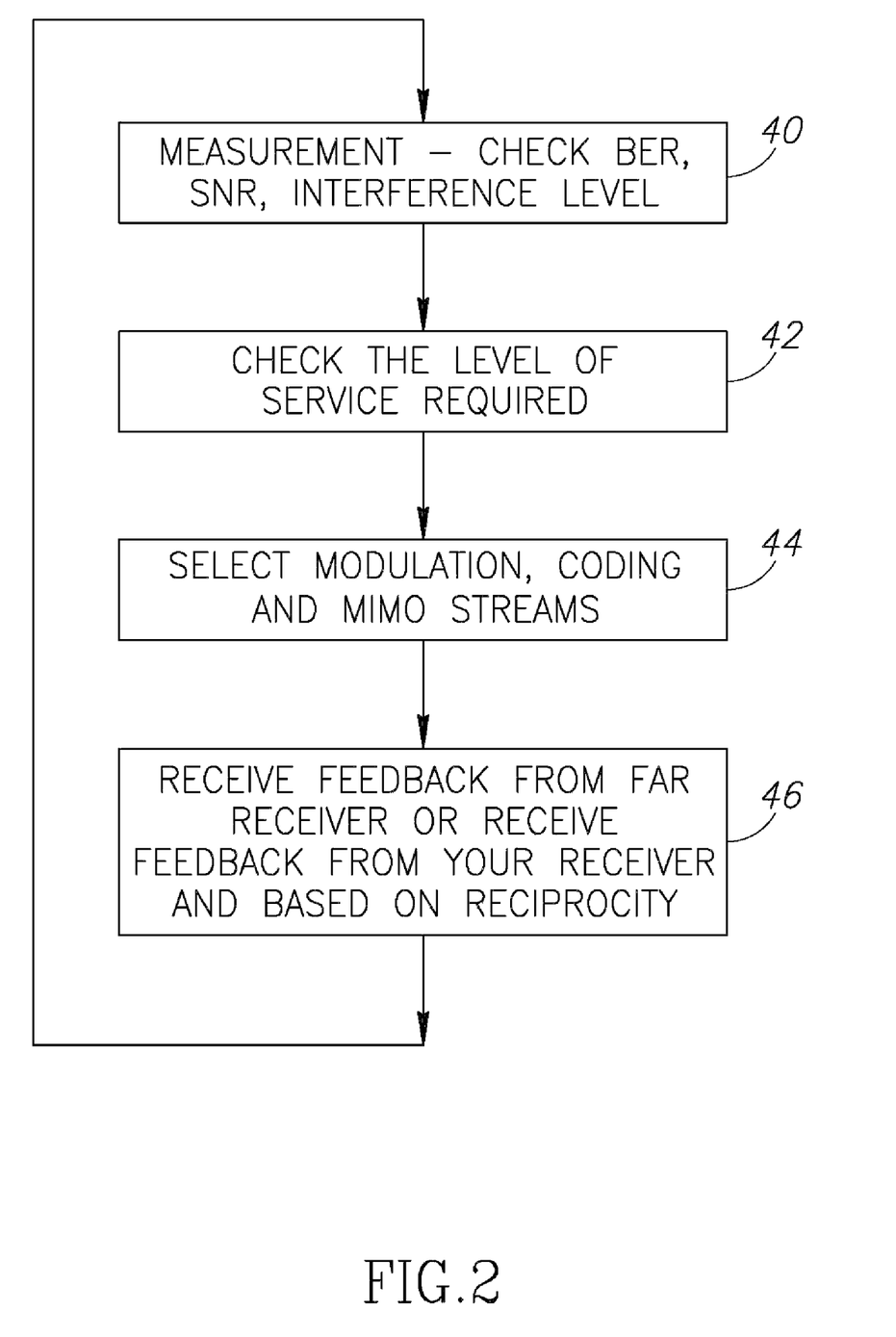
FIG. 2 a flow chart of a link adaptation process according to one embodiment of the invention

The level of service required for the link (stored in the memory) is now checked (block 42) and, in accordance to pre-defined schemes, the modulation, coding and number of MIMO streams are selected (block 44), based on the measured and reported CQI data. In one embodiment of the invention, a possible adaptation scheme (modulation, coding, MIMO) is described below:

Each node reports to the remote node its CQI over a robust link over the air.

Each CQI is received from the remote node and reported to the controller.

The controller adapts the modulation, coding and MIMO streams allocation over the link based on pre-defined CINR required per modulation and MIMO scheme. Alternatively, the CQI can provide information regarding the MIMO streams spatial separation of this specific link. This determines the capabilities of this link to operate in MIMO. If it is capable, MIMO will be enabled on this link. If not, beam forming will be explored on both sides of the link.

After the controller adapts the modulation, coding and MIMO streams over the link, it will track the link conditions by monitoring the CQI from the remote link, such as BER or BLER. In case a high BLER or BER is observed, the controller will iteratively decrease the modulation, increase coding and de-allocate MIMO streams until a pre-selected required BER is obtained. (It will be appreciated that it is not correct to look only at the BER of the node's receiver, due to different interference patterns at the two ends of the link.)

The discussion above relates to the link level, between two nodes. When forming a network, each node is deployed in a cluster with several other nodes. While the PTP system of the present invention can be used with any wireless technology, it is particularly useful in applicants' novel WiMAX network as part of the WiMAX integrated backhaul, described in detail in applicant's co-pending patent application entitled WiMAX ACCESS POINT NETWORK WITH BACKHAUL TECHNOLOGY. Other examples of such technologies, where the air interface is not WiMAX, include WiFi, 3GPP LTE, GSM, etc. The present invention will now be described with regard to such a network, with specific reference to WiMAX by way of non-limiting example, only.

Figure 3:
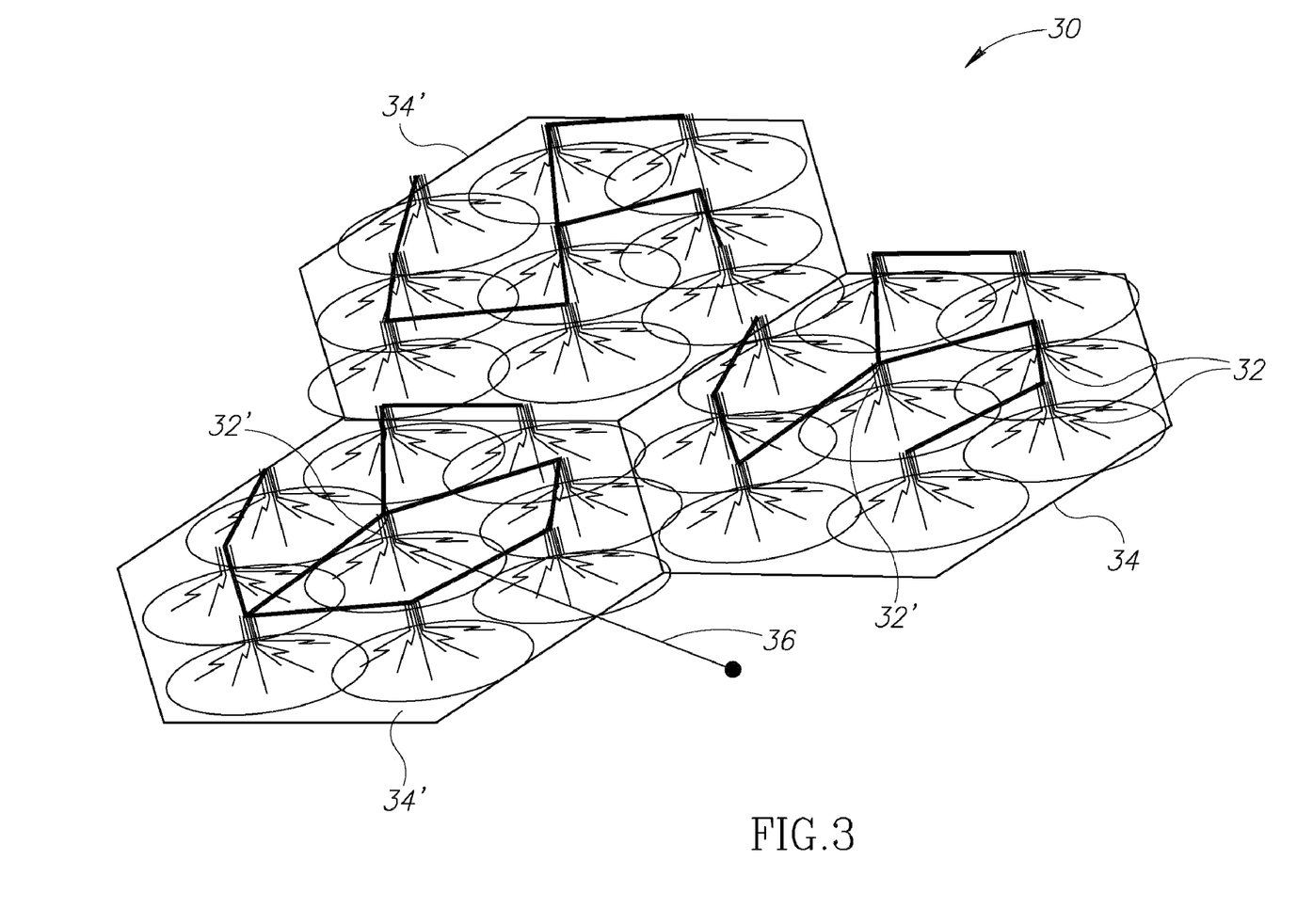
FIG. 3 is a schematic illustration of a wireless network constructed and operative in accordance with one embodiment of the present invention.

Referring to FIG. 3, there is shown one example of a next-generation mobile broadband wireless network 30 according to the present invention. The network 30 includes a plurality of access point nodes 32, substantially similar to nodes 10 described above, each of which acts as a base station for its cell. As stated above, for purposes of the present application, the term access point unit, node, base station and relay station are interchangeable. Deployment coverage is provided by a network of base stations, which is logically divided to multiple clusters 34, 34' (defined as a logically connected group of base stations). Each cluster 34 is formed of a group of access point nodes 32 wirelessly interconnected to each other (as shown in heavy black lines), each of which provides wireless access to part of the cluster.

In each cluster, one access point coordinates all the access points within the cluster and manages the backhaul network and interference-mitigation schemes. This access point is referred to as a feeder node. The feeder nodes 32' in each cluster are physically connected to the wired backhaul 36 and serve as the conventional backhaul connection point of the whole cluster 34 to the core network (not shown). Each node 32 provides access to wireless subscribers in its cell coverage area and communicates with at least one other node in the cluster, via the point-to-point communication of the invention. This communication can either be directly with the feeder node or via other node acting as a relay, to transfer its aggregated traffic towards the core network. Thus, the wireless infrastructure deployment according to the invention can include one or more relay stations which communicate with one or more base stations and enable enhancement of the coverage and the capacity of the cell.

The access point units 32 of FIG. 3 are deployed in micro-cell/pico-cell deployment configuration. Micro-/pico-cells are defined as relatively small cells (typically 300-400 m radius in dense urban areas, as an example) installed in outdoor sites, typically on street lamp posts, telephone or electric poles, and rooftops, etc., as known in conventional outdoor Wi-Fi networks, as well as in indoor sites, for in-building coverage extension and extra capacity requirements in indoor locations.

Deployment topology of the access point units is preferably using a multi-hop relay topology, rather than macro-cell or mesh technology. This means that each mobile station is coupled to a core mobile network just by the feeder node, or by one or more relay nodes for data relay. In one preferred embodiment of the invention, each access point unit 32 includes built-in, point to point backhaul, so only a single box needs to be installed in each location. This results in easy and low cost site preparation (no need for preparing conventional wired backhaul from the core to each node, but only to one node in each cluster (the feeder node)) and a low-cost installation (single unit installation). In one embodiment of the invention, for indoor coverage deployment, the unit can be equipped with fewer antennas than are used for outdoor coverage.

Figure 4:
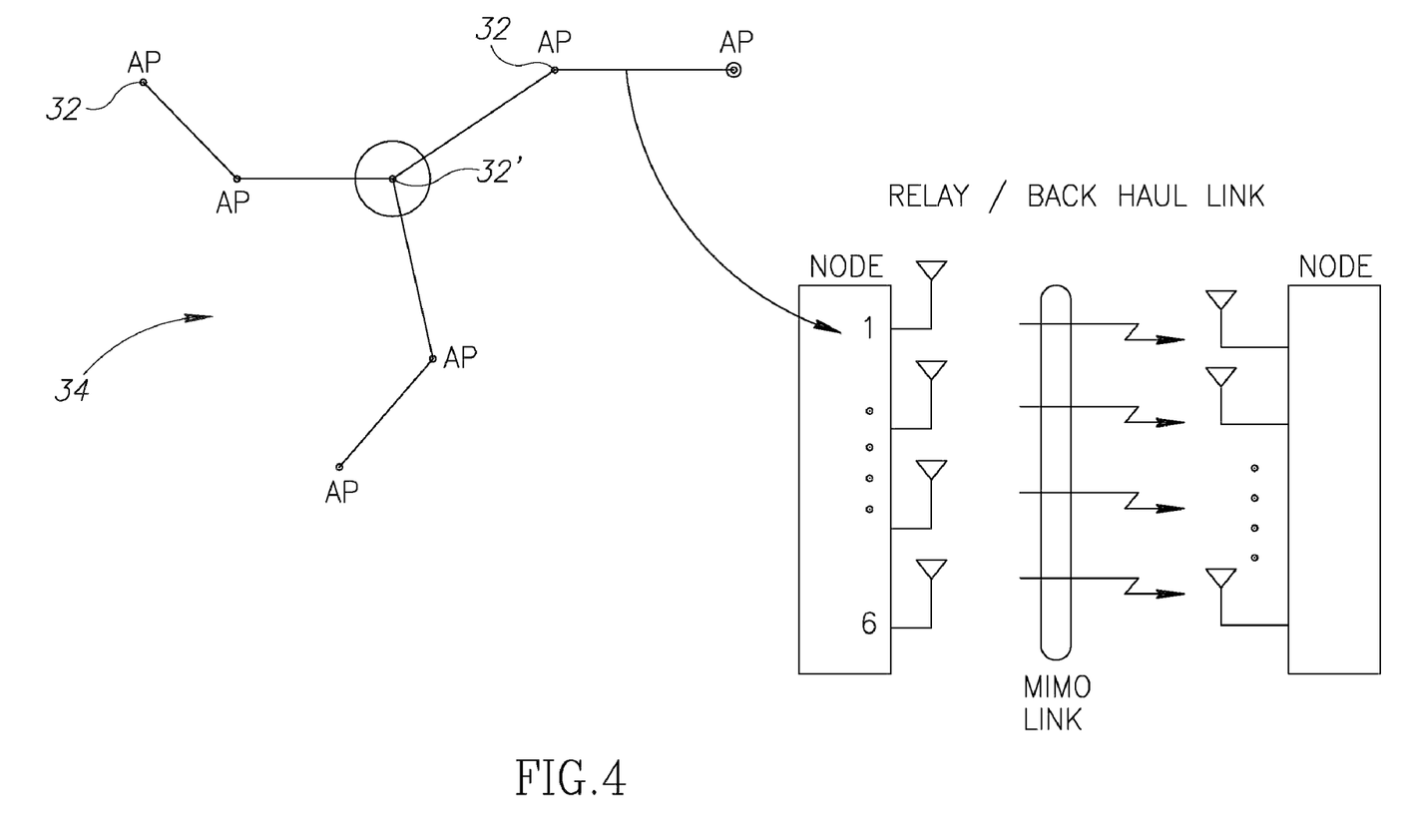
FIG. 4 is a schematic illustration of a deployment topology according to one embodiment of the invention, transmitting over a MIMO link.

The nodes in the cluster 34 of FIG. 3, in one embodiment, may be interconnected in a tree topology, the feeder node being the root of that tree, as illustrated schematically in FIG. 4. In the wireless network of the invention, the topology is preferably star, multi-hop or any combination of these two topologies. All traffic from all nodes 32 in the cluster is routed to and from the feeder node 32', and then to the wired Internet network. The path from each node communicating with the feeder node is known and static under given link and network conditions. Alternatively, routing can also adapt itself due to traffic load sharing between nodes, interference conditions, and other deployment issues.

Formation of virtual antenna groups, according to one embodiment of the invention, will now be described. A bit stream (data or symbols) to be transmitted can be transmitted over a link by all the antennas in the node or by sub-groups of antennas (e.g., 2, 3 or 6, depending on the total number of antennas in the node). As known, transmission of the same stream (1 stream) over all the antennas will improve the SNR, and the spectral efficiency will increase in proportion to the improvement in SNR. However, if the bit stream can be split into two or more MIMO streams by the modem (PHY) in the node, then the rate can be doubled (or higher) by transmitting more than one symbol on the same frequency at the same time. This, of course, will reduce the link budget per stream, which will reduce the SNR per stream.

Each MIMO stream is allocated an appropriate grouping of antennas, according to the network and/or the link configuration. Transmitting multiple streams can be accomplished when the streams are spatially separated. This separation can be gained by physical geometry separation between antennas or by rich scattering contributed by the channel, or where the streams are separated by polarization of the electromagnetic fields of the antennas, such that each stream has a different polarization, or by any other means of parallelization of the streams within predefined channels. Thus, the capacity can be increased by a factor of the number of streams since, when utilizing MIMO techniques, each receiving antenna can cancel adjacent stream interference, so as to properly receive the stream that was directed to it.

Figure 5A:
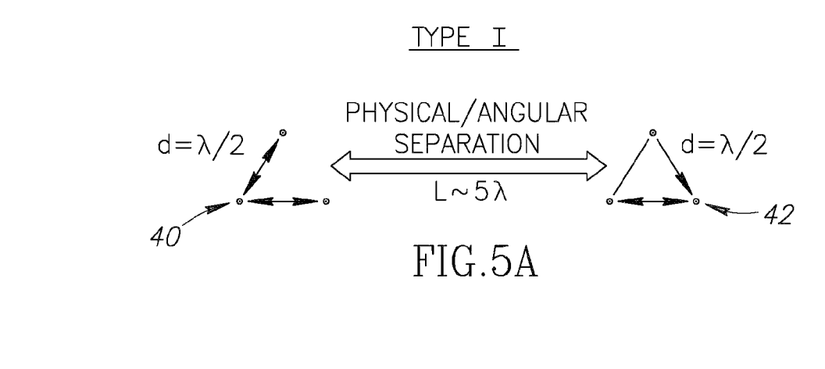
FIG. 5a is a schematic illustration of an antenna configuration according to one embodiment of the invention.

One proposed antenna configuration, illustrated schematically in FIG. 5a, involves allocating antennas to create two groups 40, 42 of antennas, each having three omni-directional antennas arranged in a triangle (as shown in hardware in FIG. 1a). As seen in FIG. 5a, the antenna groups 40 and 42 are spatially separated, with the distance d between antennas in each group typically being lambda/2, with distance L between two groups, typically >5 lambda. Alternatively, two groups of three omni-antennas can be utilized at smaller spatial distances, i.e., L<5 lambda, with polarization, i.e., one group being vertically polarized and the second being horizontally polarized, as when there is a 90° mechanical angular spatial separation between the antennas.

Figure 5B:
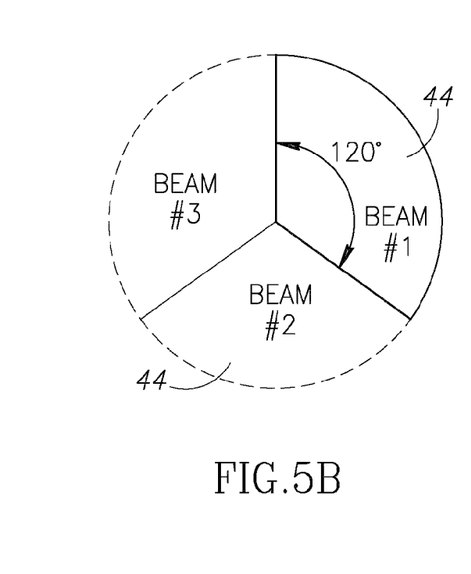

In the configuration of FIG. 5a, each group of antennas generates three beams 44 (of 1200 each) using beam-forming, as shown schematically in FIG. 5b. In addition, a diversity scheme between the two groups of antennas is preferably employed, using transmit and receive diversity methods, such as STC (Space Time Coding), CDD (Cyclic Delay Diversity), MRC (Maximum Ratio Combining), selection diversity, which provide enhancement of the link budget, resulting in increased SNR and increased spectral efficiency. These techniques can be used in either access or backhaul or both. Thus, the transmission can use one stream with one of the above diversity schemes, or two MIMO streams to enhance the capacity while sacrificing the link budget.

Figure 5C:
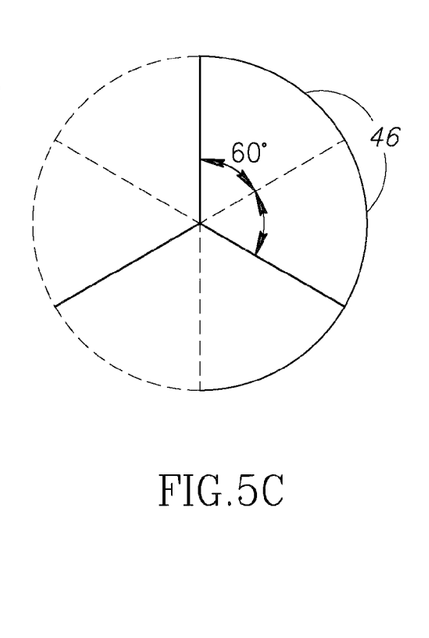

As seen in FIG. 5b, beams from six antennas can form three virtual sectors, where each virtual sector transmits and receives in a different frequency range. Beam-forming can also be used for sub-sectorization of each sector into two sub-sectors (additionally increasing the link budget), to provide essentially six sectors 46, as shown in FIG. 5c. This technique is useful, in access only, to increase link budget. Here, each sub-sector is 60° (360°/6), so each pair of beams forms a sector and uses the same frequency group. In this embodiment, it is important to note that in order to produce 6 sub-sectors with two streams in the same time, twelve antennas are required, six antennas for 60° sub-sector and six antennas for the additional stream. In FIG. 5c, the pairs forming each sector are illustrated as being adjacent to one another, but they are not limited to such configuration.

When there are two MIMO streams transmitted over six antennas, each stream transmitted to and from three antennas, the beam width can be 360/3 or 120°. Thus, in this case, the rate is twice the rate of one stream and the spectral efficiency is twice that of one stream. However, the beam is wider, causing the link budget to go down.

Similarly, where three MIMO streams are transmitted over six antennas, each stream is transmitted to and from two antennas at a beam width of 360/2 or 180°, resulting in three times the spectral efficiency but much lower link budget and more difficult reception. This option requires an antenna configuration of three pairs of antennas (not illustrated).

To sum up, a number of possibilities could exist for each MIMO stream, depending on the configuration of the antennas and antenna beam-width. Each antenna can be arranged for 1, 2 or 3 MIMO streams having beam widths as follows, when using omni-directional antennas:

| | | |
|---|---|---|
| 6 antennas: | 1 stream | 60° |
| | 2 streams | 120° |
| | 3 streams | 180° |
| 9 antennas: | 1 stream | 40° |
| | 2 streams | 80° |
| | 3 streams | 120° |
| 12 antennas: | 1 stream | 30° |
| | 2 streams | 60° |
| | 3 streams | 90° |

Figure 5D:
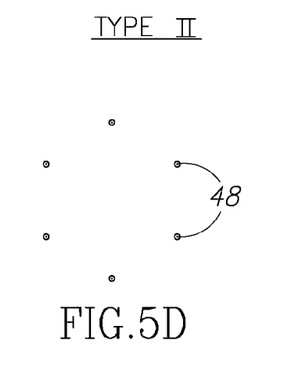
FIG. 5d is a schematic illustration of an antenna configuration according to an alternative embodiment of the invention.
Figure 5E:
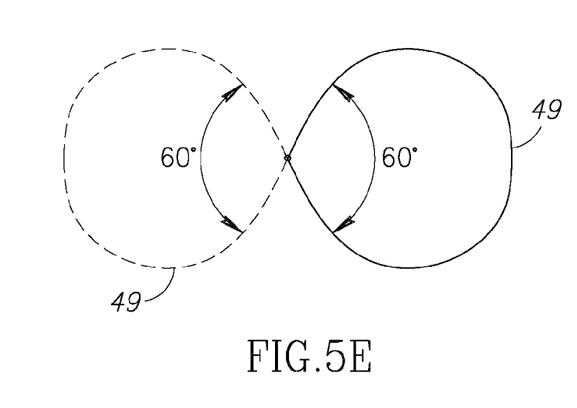
FIG. 5e illustrates an embodiment of sectorization by the antenna configuration of FIG. 5d.

An alternative proposed configuration is 6 antennas 48 arranged in a circle, as shown in FIG. 5d. With this configuration, two beams 49 of 60° are generated by the six antennas. Only beam forming for single transmissions or SDMA for multiple concurrent transmissions (described in detail below) can be utilized. (Since these antennas are not sufficiently separated spatially, MIMO cannot be utilized.)

Another alternative embodiment is to utilize a plurality of directional antennas. For example, using directional antennas of 90° each, the angle of each antenna should be 90° divided by the number of antennas times the number of streams.

Although the number of antennas is configurable (i.e., selected in advance and fixed in the hardware), the number of streams preferably is dynamic and adaptive, and is adjusted over time. Preferably, 1, 2 or 3 MIMO streams are adaptively allocated to different antennas, depending on measured link conditions, and the bandwidth beam pattern (from 180 degrees to 60 degrees) is selected to improve link budget. Thus, the number of streams is selected depending on the amount of interference, noise, signal strength (RSSI), CINR (Carrier to Interference and Noise Ratio), etc., at any given time along the link. Accordingly, the number of streams can change periodically, although not necessarily in real time.

It will be appreciated that both backhaul and multiple access communications (e.g., WiMAX) may require the support of one or more of the following types of MIMO techniques in use today:

1. STC—Space Time Codes (or Space Frequency Codes) e.g.—Alamouti Space Time Block Code (optionally coupled with MRC at the receiver) which is used to increase the SNR of a user's link using power and diversity gains.
2. MIMO multiplexing (or SDM)—multiple concurrent streams are transmitted to a user (e.g., 2 codes for 2×2 MIMO) and the user demodulates the multiple streams either with an ML receiver, other linear receiver (e.g., LMMSE) or iteratively (e.g., SIC-Success Interference Cancellation). MIMO multiplexing is used for increasing peak rate by a factor approaching 2.
3. Adaptive closed loop beam forming (BF) is used to maximize the capacity of the multiple streams, wherein the base station forms the optimum beam for the user based on the user's feedback of its CSI (Channel State Information) or a preferred codeword (e.g., by a known code book). An example of a closed loop MIMO scheme is the SVD approach, which uses unitary pre-coding.

In one exemplary embodiment of the system of the invention, which uses an antenna configuration of two sets of three antennas (two triplets), the STC and MIMO multiplexing schemes may use a pair of antennas (one from each triplet), while the triplet members may be used for sectorization within a cell.

Figure 6A:
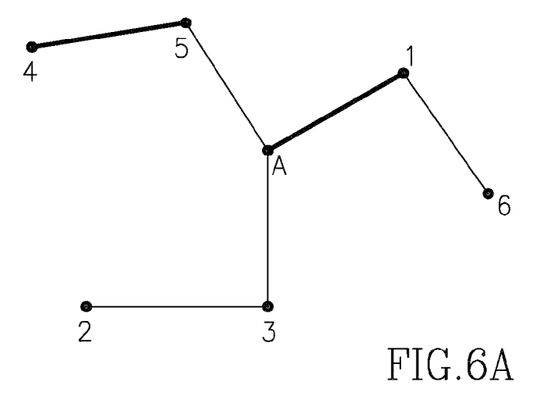
FIGS. 6a, 6b and 6c are schematic illustrations of MIMO transmissions at different times.
Figure 6B:
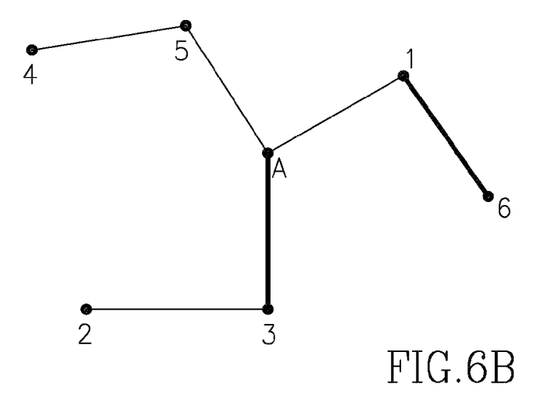
Figure 6C:
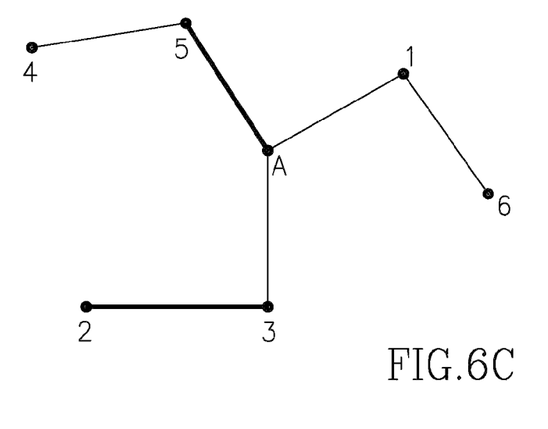

MIMO also permits concurrent PTP transmission over several non-adjacent links, which change at different times. The groups of links having transmission at any given time can change, as shown in FIGS. 6a, 6b and 6c, the highlighted links being operative as a group. In this embodiment, a high capacity point-to-point link is achieved by adaptively allocating MIMO streams (preferably up to 3 streams) to different antennas and controlling the beam pattern bandwidth (from 180 degrees to 60 degrees) to manage the deployment interference. In FIG. 6a, PTP transmission is illustrated as occurring concurrently between feeder node A and relay 1, and between access points 5 and 4. During a different time slot, as shown in FIG. 6b, PTP transmission occurs concurrently between feeder A and relay 3, and between access points 1 and 6, and during a third time slot, as shown in FIG. 6c, PTP transmission occurs concurrently between feeder A and relay 5, and between access points 3 and 2.

Each PTP link has high spectral efficiency (bit/sec/Hz) and awareness of interference. According to a preferred embodiment of the present invention, OFDMA (orthogonal frequency division multiple access) is implemented for these wireless communications. The modem and controller implement OFDMA for data transmitted over the link, preferably adaptively selecting 64 to 1024 FFT OFDMA, which enables high granularity in bandwidth allocation to each link, and modulation according to the channel conditions. OFDMA permits allocation of a part of the frequency channel bandwidth to a certain link and a different part of the frequency channel bandwidth to other links. Higher modulations, i.e., 512 or 1024 or 2048 FFT modulation, improve the robustness of the link to multi-path. According to the invention, OFDMA permits allocation of portions of time and frequency to different links. By dividing the channel into sub-channels by time and frequency, different links in the same geographical area can transmit at the same time over different frequency sub-channels, or over the same frequency sub-channels at a different time, without interfering with each other. Thus, both time and frequency diversity of the channels and frequency diversity gain are provided. This results in time and frequency granulation, which permits low penalty cost (in term of resources time/frequency) in case local frequency interference is detected.

Figure 7:
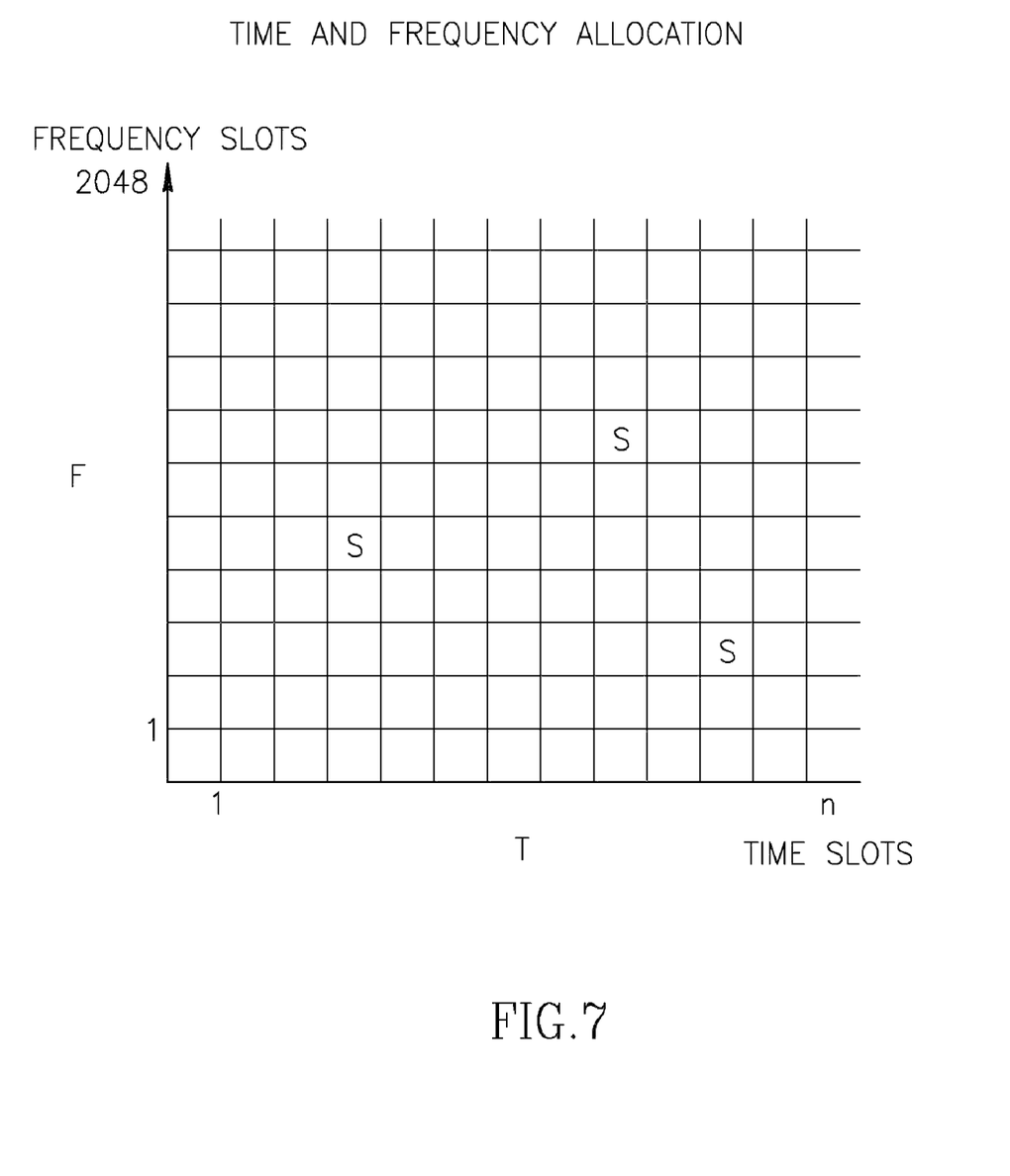
FIG. 7 illustrates a time and frequency allocation plan according to one embodiment of the invention.

A time and frequency allocation plan according to one embodiment of the invention is illustrated schematically in FIG. 7. As can be seen, the available time T is divided into n slots, while the frequency F is divided into up to 2048 frequency slots. Each link is allocated one or several, contiguous or non contiguous allocations of these time/frequency slots S. In this OFDMA allocation scheme, different data can be loaded on each frequency/time slot (defined as bins), enabling full frequency and time diversity. In this way, source information can be dynamically transmitted over different sub-channels with different power levels, modulation and coding schemes, and at different time and frequency allocations on different MIMO streams on each link.

Modulation over the various links in a wireless network according to the invention can be of any suitable type, from QPSK to 256 QAM (at present), as described above for a single link. In addition, the allocation is adaptive, and changes depending on the state of network interference and the change of link conditions. Each link is managed by its associated feeder node, which acts as a central management point. The feeder determines the interference mapping of the whole cluster. By receiving transmissions from surrounding access points on its spectrum, the feeder node learns the pattern of noise of all the streams (self-learning) and, according to the pattern, allocates physical layer PTP parameters, such as modulation, coding rate, antenna beam-width (60° to 180°), number of MIMO streams (1-3), and time and frequency slots to be transmitted on, in order to allocate the best mode and stream configuration to provide maximum capacity on the link. Each configuration has its own corresponding SNR and rate. This is preferably carried out on a frame by frame basis, e.g., every 5 milliseconds.

When there is more than one link utilizing PTP communication according to the invention near one another, interference is likely to arise during concurrent transmission over spatially close links. Accordingly, in order to improve performance, interference mitigation is highly desirable. A number of mechanisms are available for such interference mitigation for the backhaul PTP link, which are designed to maintain a CINR as high as possible in each link, so that the spectral efficiency of each backhaul link will remain high. These may include transmit power control, spatial beam coordination, sub-channel management (OFDMA), as well as null steering, coding (CDMA), link coordination and fractional frequency re-use, which are explained in detail in applicant's co-pending patent application entitled POINT-TO-POINT COMMUNICATION METHOD WITH INTERFERENCE MITIGATION.

It is a particular feature of the invention that a wireless network according to the present invention has standard compliancy in the air interface between mobile stations and access points, and all processes are completely transparent to the air interface, as defined by IEEE 802.16e.

It will be appreciated by those skilled in the art that the point to point communication described above can be used to provide improved backhaul for Wi-Fi networks. In this way, MIMO and beam forming capabilities, as well as sectorization, can be provided in backhaul in Wi-Fi, which has not been dreamt of in conventional Wi-Fi technologies. Furthermore, since the same unit providing PTP backhaul is also capable of providing WiMAX access, Wi-Fi networks incorporating the point to point backhaul of the present invention can provide to their clients dual mode access (Wi-Fi and WiMAX) with very strong backhaul in both.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for providing point-to-point wireless communication between a first and second node forming a link, the method comprising:
   providing multiple concurrent transmissions from multiple antennas in an antenna array arrangement in the first node to the second node;
   controlling beam patterns of said antennas to reduce interference; and
   allocating at least one MIMO (Multiple In Multiple Out) stream to different antennas in said antenna arrangement for said transmissions.

2. The method according to claim 1, wherein said step of allocating includes adaptively allocating said at least one MIMO stream in response to link conditions.

3. The method according to claim 1, wherein said antenna arrangement includes at least two directional antennas, and said step of controlling includes arranging said antennas to communicate in pre-selected directions.

4. The method according to claim 1, wherein said antenna arrangement includes a plurality of omni-directional antennas, and said step of controlling includes implementing beam-forming techniques.

5. The method according to claim 4, wherein said step of controlling includes utilizing beam-forming techniques to select beam patterns between 180° to 60° for said antennas.

6. The method according to claim 1, further comprising implementing OFDMA for said transmissions.

7. The method according to claim 1, further comprising utilizing modulation of at least 128 QAM for said transmissions.

8. The method according to claim 1, including adaptively allocating beam patterns to said antennas depending on link conditions.

9. The method according to claim 1, further comprising implementing a modulation adaptation scheme in said controller; and
   allocating modulation between QPSK and 256 QAM in accordance with said scheme.

10. A point-to-point link in a wireless communications network, the link comprising:
    two nodes coupled for wireless communication;
    each node including an RF transceiver and associated modem;
    an antenna arrangement in each said node for providing multiple concurrent transmissions;
    said antennas having beam patterns selected for reducing interference;
    a controller for allocating at least one MIMO stream to different antennas in said antenna arrangement for said transmissions; and
    means in said controller for allocating said MIMO streams and allocating modulation to said antennas.

11. The link according to claim 10, wherein said antenna arrangement includes at least two directional antennas having beam patterns defined in advance.

12. The link according to claim 10, wherein said antenna arrangement includes a plurality of omni-directional antennas having configurable beam patterns.

13. The link according to claim 12, wherein said controller includes means for implementing smart antenna techniques to control said beam patterns.

14. The link according to claim 10, wherein said modem and said controller include means for implementing orthogonal frequency division multiple access (OFDMA) for transmissions over the link.

15. The link according to claim 14, wherein said controller allocates one of 512 or 1024 or 2048 FFT modulation, to improve robustness of link to multi-path.

16. A mobile broadband wireless link comprising:
    two nodes;
    each said node including:
      an RF transceiver with associated modem;
      an antenna arrangement having a beam pattern selected to improve quality of transmission and reduce interference coupled to said modem and arranged for multiple concurrent transmissions;
      a MAC controller for controlling said transceiver, modem and antenna arrangement for providing both access and backhaul communication;
    said controller including means for adaptively allocating at least one MIMO stream to different antennas in said antenna arrangement for said transmissions, depending on link conditions; and
    said controller including means for allocating modulation to said antennas;
    further said modem and MAC for providing orthogonal frequency division multiple access (OFDMA) for data transmitted between said two access points.

17. The link according to claim 16, wherein said antenna arrangement includes at least two directional antennas having beam patterns defined in advance.

18. The link according to claim 16, wherein said antenna arrangement includes a plurality of omni-directional antennas having beam patterns configurable by said MAC controller.

19. The link according to claim 16, wherein each node further includes a single radio-PHY-MAC module for providing access and backhaul communication.

* * * * *